Figure 1:
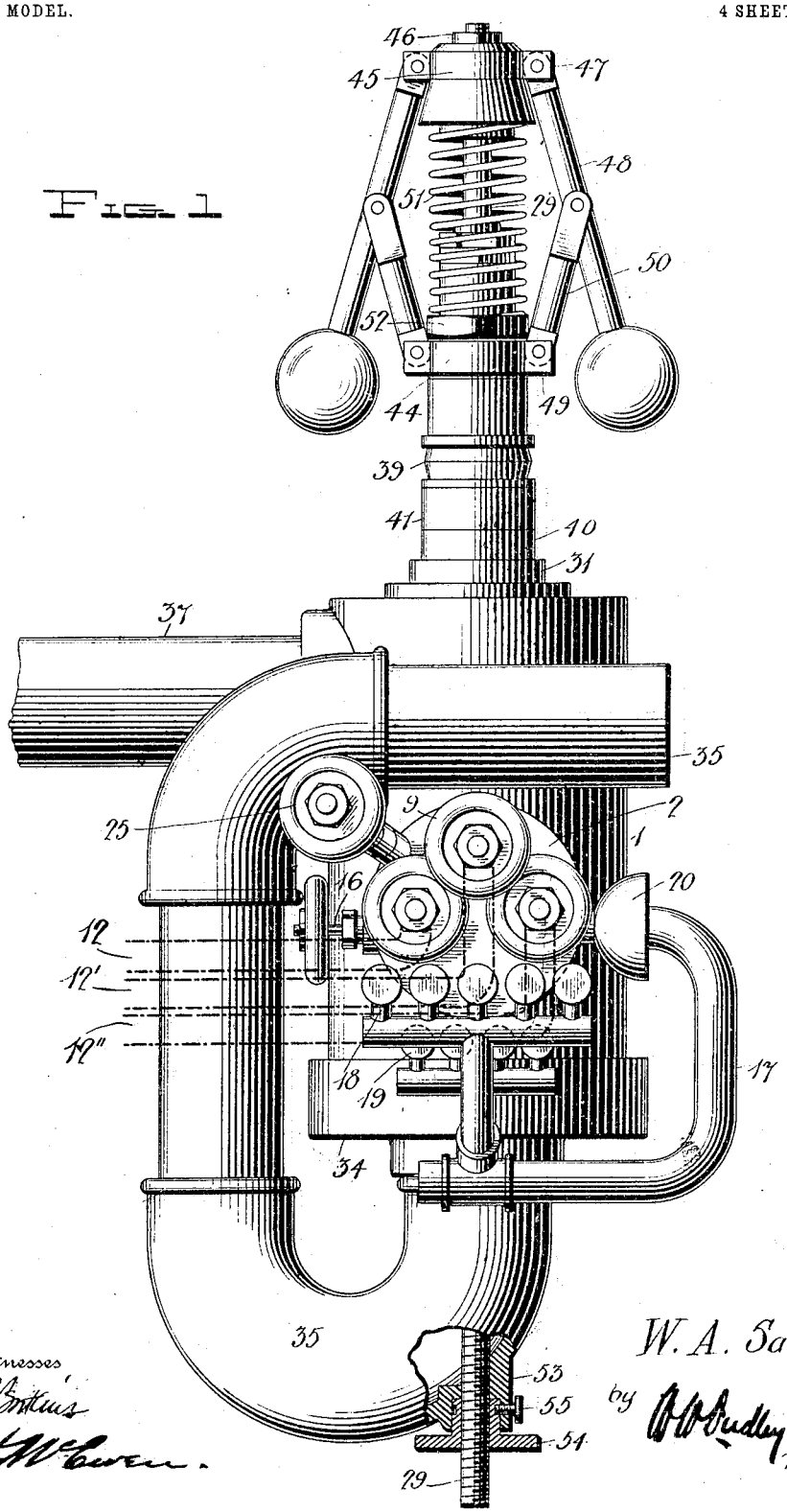

No. 766,530. PATENTED AUG. 2, 1904.
W. A. SALISBURY.
APPARATUS FOR GENERATION OF GAS.
APPLICATION FILED DEC. 19, 1903.
NO MODEL. 4 SHEETS—SHEET 2.

Witnesses

Inventor
W. A. Salisbury
By
his Attorneys

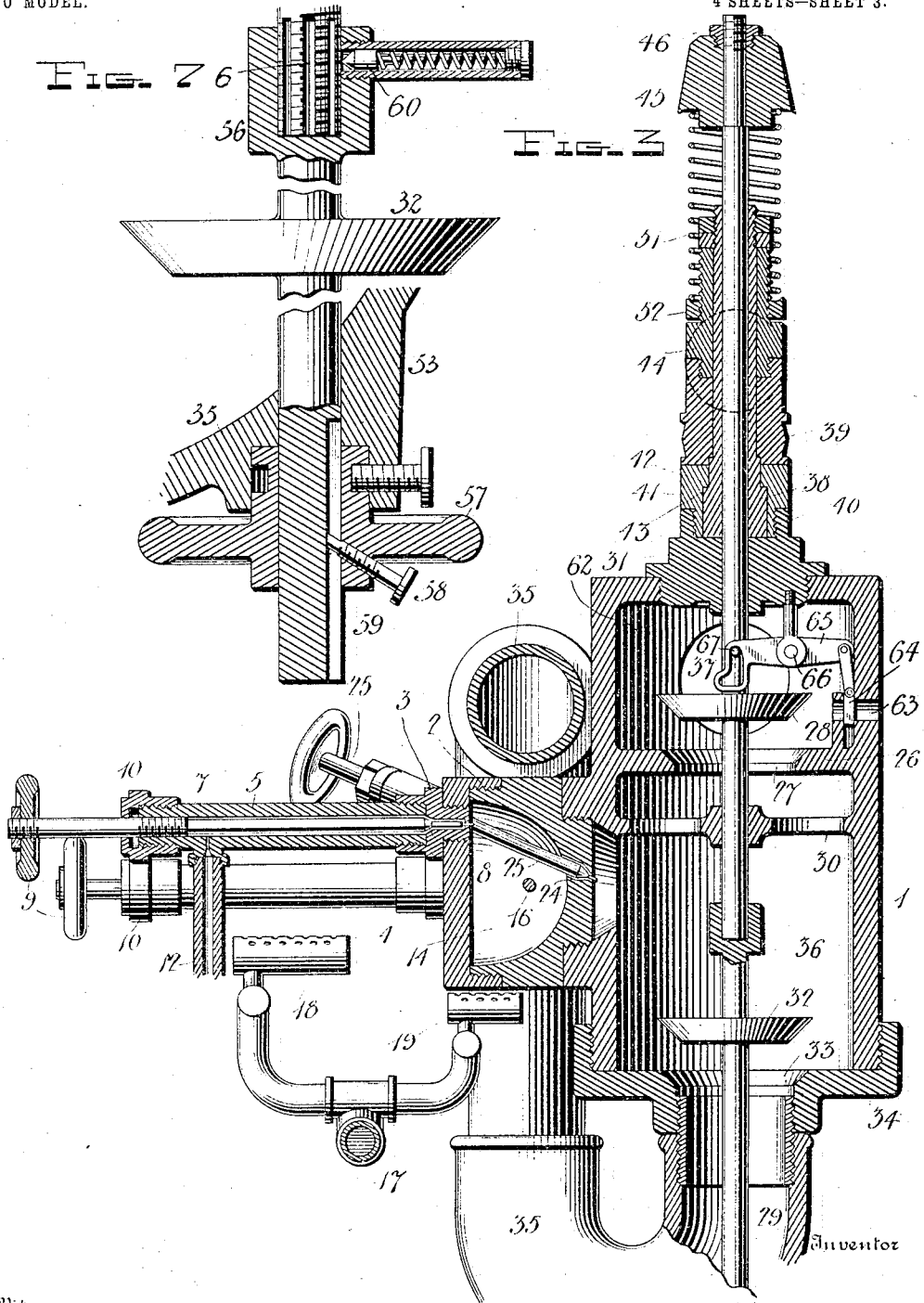

No. 766,530. PATENTED AUG. 2, 1904.
W. A. SALISBURY.
APPARATUS FOR GENERATION OF GAS.
APPLICATION FILED DEC. 19, 1903.
NO MODEL. 4 SHEETS—SHEET 4.
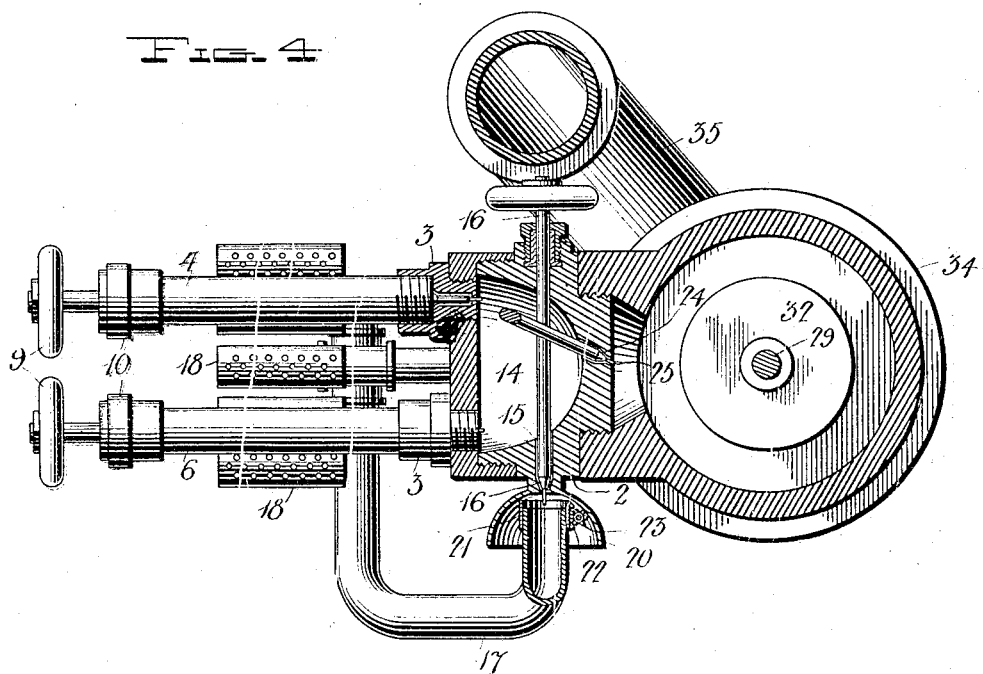
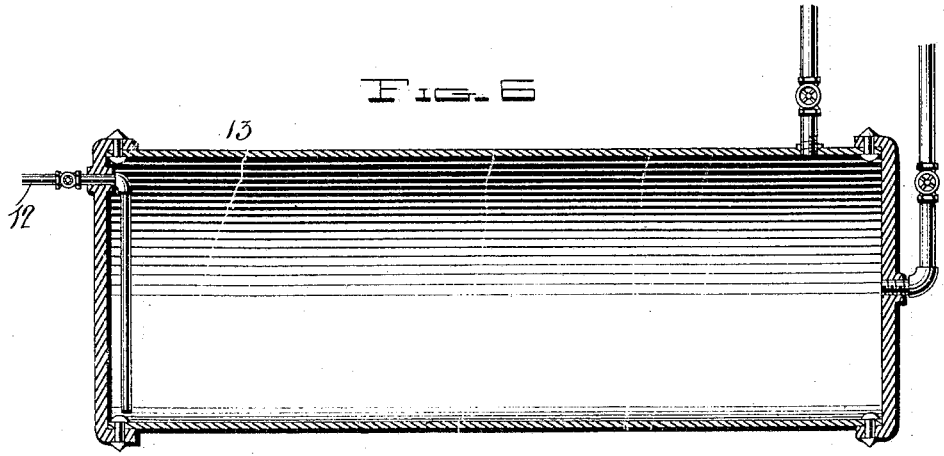
Witnesses
Inventor
W. A. Salisbury
By
his Attorneys No. 766,530. Patented August 2, 1904.

UNITED STATES PATENT OFFICE.

WILBUR A. SALISBURY, OF WINONA, MINNESOTA, ASSIGNOR OF ONE-HALF TO CHARLES O. GOSS, OF WINONA, MINNESOTA.

APPARATUS FOR GENERATION OF GAS.

SPECIFICATION forming part of Letters Patent No. 766,530, dated August 2, 1904.

Application filed December 19, 1903. Serial No. 185,848. (No model.)

*To all whom it may concern:*

Be it known that I, WILBUR A. SALISBURY, a citizen of the United States, residing at Winona, in the county of Winona and State of Minnesota, have invented certain new and useful Improvements in Apparatus for Generation of Gas; and I do hereby declare the following to be a full, clear, and exact description of the invention, such as will enable others skilled in the art to which it appertains to make and use the same.

This invention relates to apparatus for the generation of gas for heating, lighting, and power, and is particularly applicable for use in supplying the engines of automobiles and for explosive turbines or other engines used in marine or aerial navigation.

Broadly considered, an apparatus embodying my invention embraces in compact form three supply-tanks to contain, respectively, the first water, alcohol, and benzin; the second, gasolene or kerosene, and the third crude coal-oil or the heavy refuse remaining after the first distillation thereof, a heavy air or gas pressure being maintained within said tanks to insure the feeding of their contents to the gas-generators. These tanks are connected by suitable valved piping with three retorts or generators, each having valved connection with a gas-mixing chamber, which in turn has valved connection with burners located beneath the retorts and with a main mixing-chamber communicating at one point with the place of use and at another point with a hot-air-supply pipe, the intake of which extends over and is heated by the burners beneath the retorts. The supply of gas to an engine may be regulated from the engine by a governor controlling a valve between the main mixing-chamber and the exit leading to the engine, and the supply of hot air to said chamber may be regulated both by the governor and an adjustable valve, as will be pointed out hereinafter.

The main object of the invention is an apparatus capable of producing a gas either of high explosive power or of high heating power or of great illuminating power.

Another object of the invention is an apparatus to quickly produce explosive, illuminating, or heating gases at a saving of cost of material used and of maintenance.

Further objects of the invention will be apparent from a perusal of the ensuing specification.

Figure 2:
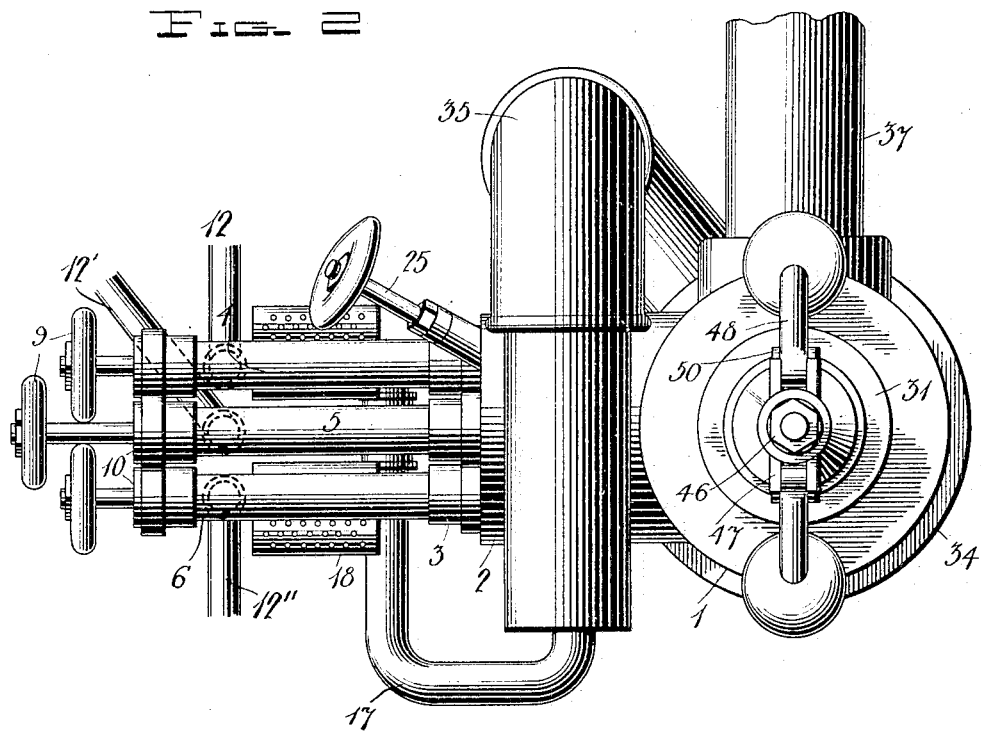
Figure 5:
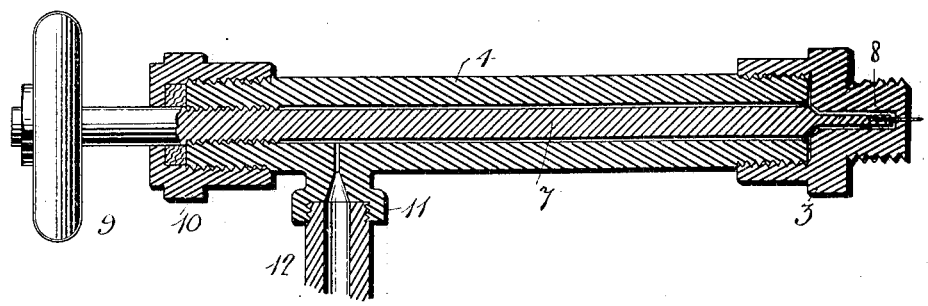

In the accompanying drawings, Figure 1 is a side elevation of my improved apparatus. Fig. 2 is a top plan view. Fig. 3 is a vertical sectional view of the same. Fig. 4 is a horizontal sectional view of the same. Fig. 5 is an enlarged sectional view of one of the retorts. Fig. 6 is a sectional view of one of the supply tanks or holders. Fig. 7 is an enlarged detail view of a modification of the air-controlling valve.

In constructing an apparatus embodying my invention I provide a casing 1, herein shown as cylindrical, to one side of which is secured a hollow shell 2, the outer end or head of which is tapped to receive the threaded nipples 3, forming the discharge ends of three vaporizers or retorts 4, 5, and 6, each containing a valve-stem 7, terminating at its inner end in a needle-valve 8 and fitted at the outer end with a suitable wheel or handle 9, by which the stem may be rotated and its valve adjusted. The vaporizers are preferably cylindrical and screwed at their inner ends into the nipples 3, (in which are formed seats for the needle-valves 8,) their outer ends being closed by screw-caps 10, which, in conjunction with the ends of the vaporizing-cylinders, constitute stuffing-boxes for the valve-stems 7. A convenient construction of vaporizer and valve-stem is shown in Fig. 5, wherein the outer end of the vaporizing-cylinder is internally threaded to receive the threaded part of the stem, said stem being reduced in diameter from the thread to its needle-point, thus leaving an annular space around the stem for the reception of the material to be vaporized. Each vaporizer or retort is provided with a tubular boss 11 to afford connection with a valved supply-pipe leading from a suitable supply-tank 13, conveniently located, the said separate pipes being respectively numbered 12, 12', and 12" and the several tanks being of a construction to withstand a heavy air or gas pressure which will be maintained therein to give the required "head" for feeding the material to the retorts or vaporizers.

The shell 2 is provided interiorly with a chamber 14, into which the gas or vapor from the retorts 4, 5, and 6 is discharged, the wall of said chamber opposite the head 3 being concave to cause the currents of vapor entering through said head to be deflected and thoroughly mixed. A portion of the mixed gases pass from this gas-mixing chamber 14 through an opening 15, controlled by a needle-valve 16, to a pipe 17, leading to burners 18 and 19, arranged beneath the retorts and shell 2, as seen in Figs. 1 and 3. The pipe 17 is open at the end adjacent to the shell 2 to admit of the drawing in of air by the current of gas to promote combustion at the burners, and its open end is protected by a hood 20 to guard against ignition of the gas at this point. Said pipe 17 is also surrounded at its open end by a sleeve 21, adjustable to regulate the quantity of air drawn therein. As a means of adjustment I have shown a rack 22 secured to the sleeve and meshing with a pinion 23, which is operated by a hand-wheel on its shaft. The gas-mixing chamber 14 is also provided with a passage or port 24, leading to the interior of the casing 1, said port being controlled by a needle-valve 25.

The casing is divided interiorly a short distance from its upper end by a partition 26, having a circular opening 27, which forms a seat for a valve 28, carried by a stem 29, arranged centrally within the casing and being vertically movable in a guide 30 below the valve-seat 27 and in a removable cap 31, forming a part of the upper head of the casing. The valve-stem 29 is made in two sections, the lower one being adjustable vertically and carrying a disk valve 32, adapted to close upon a seat 33, formed in a removable cap 34, constituting the lower head of the casing.

An air-pipe 35 communicates at one end with the opening in the head or cap 34, the major part of said pipe standing vertically beside the outer wall of the casing 1 and adjacent to the burners beneath the retorts and shell 2. The upper end of this pipe 35 extends horizontally over the shell 2, and hence is subjected to a high degree of heat throughout its vertical and horizontal members, thus providing for the heating of air drawn in through its open end and the discharge of said heated air into that space in the cylinder or casing between the partition 26 and the lower head 34, which I term the "main" mixing-chamber 36. The casing is provided near its upper end above the partition 26 with a discharge opening or pipe 37 to convey the gas to an engine, heating or lighting plant, or other point of use.

The valve-stem 29 projects above the casing 1 and is connected exteriorly of the casing with means actuated by the engine, light or heat plant, or other point where the gas is utilized to adjust the stem and its valves 28 and 32, and thus regulate the quantity of gas supplied to the point of use. The means herein shown for effecting this result in an engine consists of a governor actuated from a moving part thereof. As before stated, the valve-stem passes through and is guided by a cap 31, forming part of the upper head of the casing 1. This cap forms a step-bearing for a sleeve 38, revolubly mounted on the valve-stem 29 and having fixed thereon a pulley 39, which is connected with the engine by a belt. (Not shown.) The cap 31 is provided with an internally-threaded boss 40 to receive a nut 41, having internally-projecting annular shoulder 42, which engages an annular shoulder 43 on the sleeve 38, thus preventing said sleeve from vertical movement, and the upper end of the pulley is threaded internally to receive the threaded boss of a yoke 44, mounted on the sleeve and secured thereon by a nut and jam-nut threaded onto the upper extremity of the sleeve. Upon the upper end of the valve-stem 29 is journaled a yoke 45, secured against vertical movement thereon by a nut 46 and provided at opposite sides with lugs 47, in which are pivoted the upper ends of governor-arms 48, the lower ends of which carry the usual governor-ball weights. The lower yoke 44 is provided with corresponding lugs 49, to which are pivoted the lower ends of links 50, the upper ends thereof being pivoted on the governor-arms 48 at suitable points. Between the upper and lower yokes and encircling the valve-stem is a spring 51, the opposite ends of which bear upon said yokes, to the end that the valve-stem 29 and its valves may be held normally in their elevated position, with the valves 28 and 32 open, but that as the governor-balls swing out, due to the speed of rotation of the pulley and sleeve 39 and 38, the valve-stem and its valves will be lowered, thus cutting off to a greater or less extent the passage of gas and air through the casing. As a means to regulate the tension of the spring 51 I have shown the hub of the lower yoke 44 threaded exteriorly to receive a bearing-nut 52, upon which the lower end of the spring is seated, it being obvious that the tension of said spring may be increased or diminished by the adjustment of said bearing-nut to a higher or lower position on the hub.

As before stated, the lower section of the stem 29 and valve 32 are adjustable, the purpose being to permit of the admission of hot air in regulated quantity through the hot-air pipe 35 into the main mixing-chamber 36.

Referring to Figs. 1 and 3 the lower stem-section is slip-joined to the upper section, and said lower section has a threaded lower end extending through the hot-air pipe 35, a box 53 being provided at the stem-opening. A nut 54, into which the stem is screwed, serves to move the stem to adjust the valve, the nut being held within the box-recess by a screw 55. In Fig. 7 the stem-sections are screw-joined, as at 56, and consequently are moved together by the action of the governor. A hand-wheel 57 serves to rotate the lower stem-section to adjust the valve 32, a screw 58, carried by the wheel, engaging a groove 59 in the stem to compel the turning of the stem with the wheel to effect the adjustment by the screw-joint. Accidental turning of the lower stem-section on the upper section after adjustment is prevented by the engagement of a spring-pressed finger 60 with one of a number of grooves 61 in the lower end of the upper stem-section.

In operation the tanks 13 are charged, one with a mixture of water, (eight parts,) alcohol, (one part,) and benzin, (one part,) and a volume of carbonic-acid gas or some equivalent gas that will readily combine with the other parts of the mixture and carbonate the same. Another tank is supplied with a charge of gasolene or kerosene and air under pressure, and the third tank contains a charge of crude coal-oil or the refuse after the first distillation and air under pressure. The turn-plugs in the supply-pipes 12, 12', and 12" are now opened to connect the several tanks with the retorts 4, 5, and 6, and the valve of retort 4, which receives gasolene, is opened to permit gasolene to be sprayed into the gas-chamber 14, from whence it escapes through valve 16 into pipe 17, drawing with it a proportion of air, and so to the burners 18 and 19, where it is ignited and heats the several retorts sufficiently to vaporize the contents thereof. The valves of retorts 5 and 6 (one or both) are now opened, and the vapors therefrom being forcibly projected into the gas-chamber 14 become intimately mixed, producing a compound gas of high explosive power or of great heating or candle power, according to the proportion of vapor discharged from the several retorts, this of course being regulated by the manipulation of the several valves by the attendant. It will be observed that the hot vapors issuing from the several retorts are further heated in the gas-mixing chamber 14, as the shell 2, constituting the walls of said chamber, is heated by the burners 19, located beneath it. The valve 25 is now opened, and the hot mixed gas is injected into the main mixing-chamber 36, where it is mixed with a proper proportion of hot air drawn in through the pipe 35, the desired proportion of hot air being regulated by adjustment of the air-valve 32.

While in the foregoing description I have named three supply-tanks and three retorts, I do not confine myself to this exact construction, as good results may be obtained from two retorts, or a greater number than three may be used, as experience and particular requirements demand.

To prevent the formation of a vacuum in the chamber 62 when the valve 28 is seated, I provide in the casing-wall an air-inlet 63, controlled by a gate-valve 64, having link connection with one end of a lever 65, pivoted at 66, the other end of the lever being slotted for engagement with a pin 67, carried by the valve-stem. In the raised or unseated position of the valve the inlet is closed by the gate-valve, whereas in the seated position of said valve the inlet is open to admit air, as will be understood.

Details of construction are not specifically described herein, though shown in the accompanying drawings, since I claim, broadly, an apparatus constructed to carry out my invention irrespective of specific details of construction; but it will be understood that I may elect to claim specifically in this application all details of construction shown or their equivalents.

I claim as my invention—

1. A gas-generating apparatus comprising a plurality of retorts each having an independent supply, a gas-mixing chamber having valved communication with each retort, and burners beneath the retorts and gas-mixing chamber having valved communication with said chamber and communication with the air.

2. A gas-generating apparatus comprising a plurality of retorts each having an independent supply under pressure, a gas-mixing chamber having valved communication with each retort, and burners beneath the retorts and gas-mixing chamber having valved communication with the gas-mixing chamber and communication with the air.

3. A gas-generating apparatus comprising a plurality of retorts each having an independent supply, a gas-mixing chamber having independent valved communication with each retort, burners beneath the retorts and gas-mixing chamber having valved communication with the gas-mixing chamber and communication with the air, and a main mixing-chamber having valved communication with the gas-chamber and with an exit and hot-air supply.

4. A gas-generating apparatus comprising a plurality of retorts each having an independent supply, a gas-mixing chamber having independent valved communication with each retort, burners beneath the retorts and gas-mixing chamber having valved communication with the gas-mixing chamber and communication with the air, and a main mixing-chamber having valved communication with the gas-chamber and with an exit and hot-air supply controlled by movable valves.

5. A gas-generating apparatus comprising a plurality of retorts each having an independent supply, a gas-mixing chamber having independent valved communication with each retort, burners beneath the retorts and gas-mixing chamber having valved communication with the gas-mixing chamber and communication with the air, and a main mixing-chamber having valved communication with the gas-chamber and with an exit controlled by a movable valve and with a hot-air supply controlled by an adjustable valve.

6. A gas-generating apparatus comprising a plurality of retorts each having an independent supply, a gas-mixing chamber having independent valved communication with each retort, burners beneath the retorts and gas-mixing chamber having valved communication with the gas-mixing chamber and communication with the air, and a main mixing-chamber having valved communication with the gas-chamber and with a discharge, and with an air-pipe heated by the burners beneath the retorts and gas-mixing chamber.

7. A gas-generating apparatus comprising a plurality of retorts each having an independent supply, a gas-mixing chamber having independent valved communication with each retort, burners beneath the retorts and gas-mixing chamber having valved communication with the gas-mixing chamber and communication with the air, and a main mixing-chamber having valved communication with the gas-chamber and with a valved exit and valved air-supply, in combination with an engine controlling the area of the valved exit.

8. A gas-generating apparatus comprising a plurality of retorts each having an independent supply, a gas-mixing chamber having independent valved communication with each retort, burners beneath the retorts and gas-mixing chamber having valved communication with the gas-mixing chamber and communication with the air, and a main mixing-chamber having valved communication with the gas-chamber, an exit and hot-air supply controlled by valves carried by a common stem, a governor mounted on said stem, and actuated by an engine supplied by the gas-exit.

In testimony whereof I affix my signature in presence of two witnesses.

WILBUR A. SALISBURY.

Witnesses:
D. E. TAWNEY,
HELEN B. CURTIS.